United States Patent
Herz

(10) Patent No.: US 8,871,005 B2
(45) Date of Patent: Oct. 28, 2014

(54) METHODS OF REGENERATING DESICCANT IN A BREATHING APPARATUS

(71) Applicant: Qualitrol Company, LLC, Fairport, NY (US)

(72) Inventor: Joshua J. Herz, Rochester, NY (US)

(73) Assignee: Qualitrol Company, LLC, Fairport, NY (US)

( * ) Notice: Subject to any disclaimer, the term of this patent is extended or adjusted under 35 U.S.C. 154(b) by 137 days.

(21) Appl. No.: 13/731,916

(22) Filed: Dec. 31, 2012

(65) Prior Publication Data

US 2014/0182452 A1    Jul. 3, 2014

(51) Int. Cl.
*B01D 53/04* (2006.01)

(52) U.S. Cl.
CPC ............ *B01D 53/0462* (2013.01); *B01D 53/04* (2013.01); *B01D 2257/80* (2013.01); *B01D 53/0454* (2013.01)
USPC ...................................... 95/14; 95/18; 95/121

(58) Field of Classification Search
CPC ............... B01D 53/04; B01D 53/0454; B01D 2257/80; B01D 2259/40009
USPC .......... 95/14, 18, 114, 115, 126, 148; 96/112; 55/385.4; 34/473, 80
See application file for complete search history.

(56) References Cited

U.S. PATENT DOCUMENTS

| | | | | |
|---|---|---|---|---|
| 4,543,446 | A * | 9/1985 | Foss et al. | 174/11 R |
| 4,832,711 | A * | 5/1989 | Christel et al. | 95/14 |
| 5,405,431 | A | 4/1995 | Eastman | |
| 5,902,381 | A * | 5/1999 | Golner et al. | 96/146 |
| 6,709,496 | B2 * | 3/2004 | Viereck et al. | 96/111 |
| 7,285,150 | B2 * | 10/2007 | Golner et al. | 55/417 |
| 7,332,015 | B2 * | 2/2008 | Golner et al. | 95/10 |
| 7,833,312 | B2 | 11/2010 | Viereck et al. | |
| 2009/0000472 | A1 | 1/2009 | Viereck et al. | |

OTHER PUBLICATIONS

European Search Report in corresponding European Application No. 13199418.8, dated Apr. 16, 2014 5 pages.

* cited by examiner

*Primary Examiner* — Frank Lawrence
(74) *Attorney, Agent, or Firm* — Brian B. Shaw, Esq.; Thomas B. Ryan; Harter Secrest & Emery LLP

(57) ABSTRACT

A method of regenerating a desiccant in a breather communicating with a vessel includes creating a temperature signal that is a temperature associated with at least one of the vessel and the breather for a plurality of cycles, each cycle having a predetermined duration, and regenerating the desiccant when the second derivative of the temperature signal reaches a peak value.

21 Claims, 1 Drawing Sheet

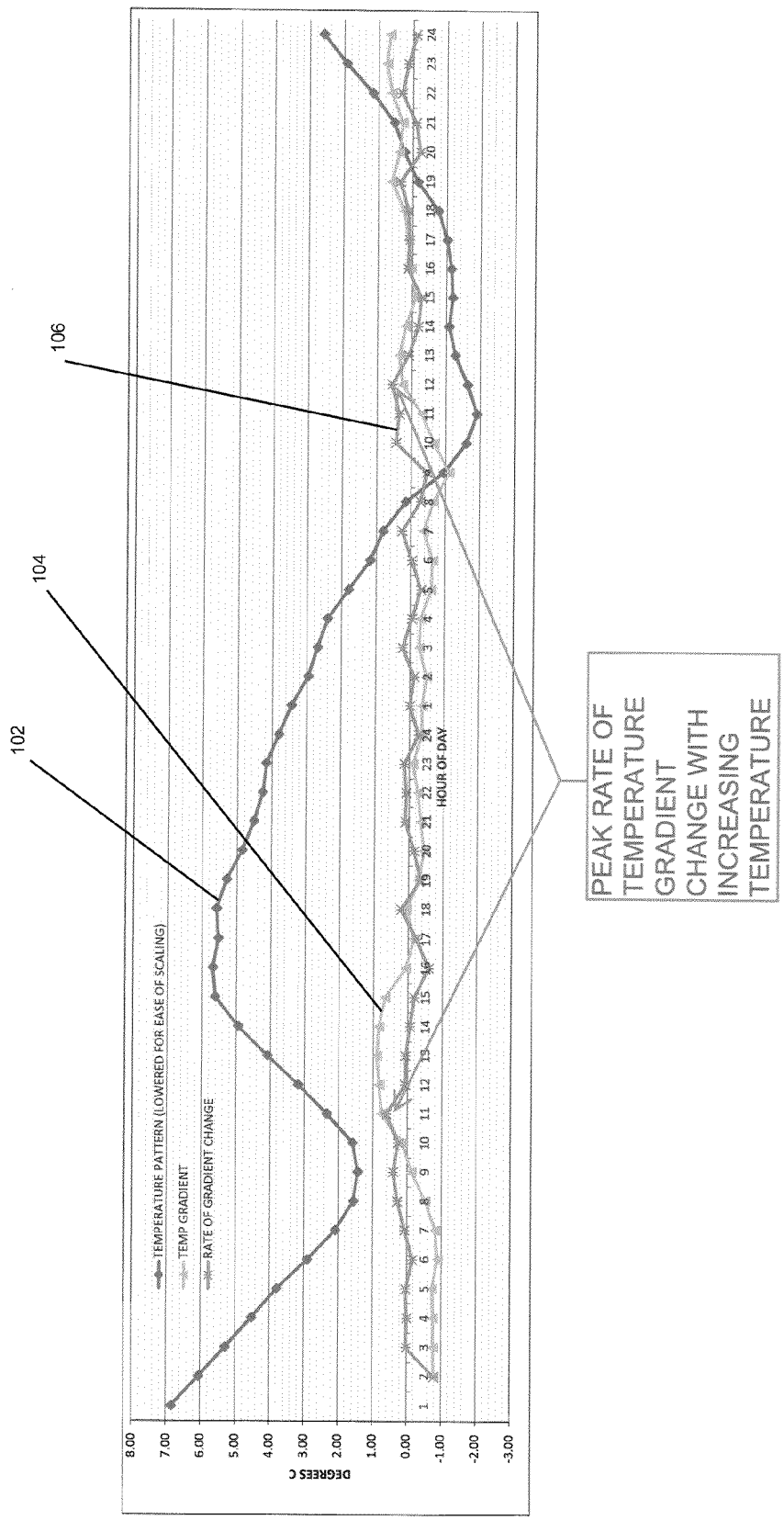

METHODS OF REGENERATING DESICCANT IN A BREATHING APPARATUS

BACKGROUND OF THE INVENTION

1. Field of the Invention

This application relates to transformers. More specifically, the invention relates to a breather for dehumidifying air drawn into an expansion tank in a transformer.

2. Related Art

Breathers for dehumidifying air entering an expansion vessel for an oil-filled transformer are conventional in the art. Such breathers include a moisture absorbing medium, i.e., a desiccant, that absorbs moisture from the incoming air. The medium can be regenerated, e.g., by heating, so that it can be reused after saturation.

As is known conventionally, it is important to have positive pressure in the transformer prior to regeneration of desiccant in a breather, so that the moisture pulled from the desiccant will be exhaled from the breather. Determining whether positive pressure exists has conventionally been done by measuring one or more of pressure, vacuum, flow or temperature.

Of the approaches, temperature-based monitoring is generally cheaper because temperature sensors are less expensive. Temperature monitoring to determine positive pressure generally includes taking successive temperature measurements at some time interval, typically hourly. A series of these measurements, generally on the order of days, can then be used to predict a positive pressure scenario that is optimal for regeneration. Such an approach is taken, for example, by U.S. Pat. No. 7,833,312.

A drawback of using the conventional temperature method, however, is that it relies upon the repeatability of the transformer loading cycle, which is not always certain.

Thus, there is a need in the art for a more reliable approach to determining timing and existence of positive pressure in a transformer.

There is also a need in the art for such an approach that is based on temperature measurements.

SUMMARY OF THE INVENTION

This invention remedies the foregoing deficiencies of the prior art by providing improved methods for determining positive pressure in a transformer.

In one aspect, the invention relates to a method of regenerating a desiccant in a breather communicating with a vessel. The method includes measuring, using a temperature sensor, a temperature associated with at least one of the vessel and the breather. The method also includes repeating the measuring step for a plurality of cycles, each cycle having a predetermined time, creating a temperature signal that is the measured temperature for each cycle, determining a second derivative of the temperature signal with respect to time, and regenerating a desiccant in the breather communicating with the vessel when the second derivative of the temperature signal with respect to time reaches a peak value.

In another aspect, the first derivative and the second derivative of the temperature signal are taken with respect to time. The desiccant is regenerated when the first derivative of the temperature signal with respect to time is positive for two successive cycles and the second derivative is at peak for a given time interval at the first of the two successive cycles.

In another aspect of the invention, the temperature of air entering and/or exiting the breather is used to determine the temperature signal.

In another aspect of the invention, the temperature of a headspace in the vessel is used to determine the temperature signal.

In another aspect of the invention, the temperature of oil in the vessel is used to determine the temperature signal.

These and other aspects and features of the invention will be appreciated with reference to the following detailed description and accompanying figures, in which preferred embodiments of the invention are described and illustrated.

BRIEF DESCRIPTION OF THE DRAWING FIGURES

FIG. 1 is a graphical plot of a temperature signal, the first derivative of the temperature signal with respect to time, and the second derivative of the temperature signal with respect to time.

DETAILED DESCRIPTION OF THE INVENTION

As noted above, this invention relates to the regeneration of a desiccant used to dry air entering an expansion vessel, such as in an oil-filled transformer. Although this description will be generally in terms of a transformer, other uses may also be appreciated by those having ordinary skill in the art.

As described above, breathers incorporating a desiccant are well known that remove moisture from air entering an oil-filled transformer when the pressure in the container decreases to a level below the ambient pressure. Upon absorbing a certain amount of moisture, the desiccant must be either recharged or replaced.

Prior art rechargeable breathers include a heat source, such as a heater, that warms the desiccant to a temperature at which the desiccant will "give up" the moisture to the ambient environment. The heater is turned on to regenerate the desiccant when the pressure inside the tank is increasing, such that the moisture being given-up is exhaled from the breather.

In a preferred embodiment of this disclosure, the exhaling phase of the breather is determined using a temperature sensor. The temperature sensor may be disposed in any number of locations, including but not limited to, in the oil in the transformer, in the headspace in the transformer, and in the air flow of the breather. Any location in which an accurate temperature associated with the functioning of the transformer may be obtained can be used in the invention.

The temperature sensor preferably is programmed to take temperature readings at predetermined time intervals. For example, the temperature may be read every minute, every five minutes, every hour, etc. The interval is not necessarily a consistent interval. For example, the temperature may be taken every minute during some periods and every five minutes in other intervals.

The temperature readings over a period of time result in a temperature signal, i.e., a signal of temperature as a function of time. Such a temperature signal is illustrated in FIG. 1 as temperature curve 102 titled "TEMPERATURE PATTERN." In the illustration of FIG. 1, the actual temperature readings are lowered for ease of scaling (that is the oil temperature in the transformer is generally much higher, i.e., it fluctuates from about 70 to about 80-degrees Celsius, not from about −2 to about 7 degrees, as illustrated), but the shape of the curve is accurate. As illustrated, a data point is provided for each one-hour temperature cycle. This may represent a single temperature measurement taken each hour, or the plotted measurement may incorporate a number of temperature measurements taken during the cycle, with the plotted value being an average, for example.

Prior art regenerating breathers look to this TEMPERATURE PATTERN and regenerate their desiccant when the temperature increases, i.e., between two consecutive cycles. FIG. 1 also includes a temperature gradient curve 104, labeled TEMPERATURE GRADIENT, which plots the slope of the temperature curve 102 at each cycle. That is, the temperature gradient curve 104 represents the first derivative of the temperature signal with respect to time.

Also illustrated in FIG. 1 is a rate of gradient change curve 106, labeled RATE OF GRADIENT CHANGE, which represents the second derivative of the temperature signal with respect to time.

Using information from the curves illustrated in FIG. 1 provides a better understanding and a more consistent estimation of increasing pressure in the vessel, and thus better indicates when the desiccant should be regenerated in the breather.

In one embodiment of the invention, the time at which the rate of gradient change curve 106 peaks for a given time is the trigger to start the regeneration process. For example, as illustrated in FIG. 1, in the first 24-hour period, i.e., the first day, the rate of gradient change curve 106 peaks during the 11th hour. In the second day, it peaks during the 12th hour. Starting the regeneration process at these peak occurrences is preferred timing to ensure that the breather is exhaling.

Thus, in this embodiment, the regeneration process is started when the rate of gradient change peak measurement is detected. In practice, this means that a heater or other warming device is turned on when the peak rate of gradient change is detected to warm the desiccant. Warming the desiccant will drive the water from the desiccant, and the moisture will be carried out of the breather by the exiting air.

While the embodiment just described contemplates regenerating the desiccant at each peak rate of gradient change, the process may also require determining that the peak is at or above a certain level. For example, historical data about the changing temperature may show that a "peak" value that is below some threshold amount is actually not a "peak" that should trigger regeneration. Controlling regeneration to be accomplished only when the second derivative of temperature with respect to time reaches a peak level that is above a threshold helps to avoid mistaken regeneration at a relatively high value that is not actually peak.

In another embodiment, the peak value of the second derivative of temperature is determined to be a peak by looking back a predetermined amount of time. In this embodiment the system may be programmed to start the regeneration sequence when the second derivative determined at any time is the greatest over some length of time. For example, the regeneration process may be started when the value of the second derivative is higher than the value of any second derivative for the preceding 24-hours. Applying this methodology to FIG. 1, and assuming that regeneration was started the first day at hour 11, each value of the second derivative for the next 24 hours, i.e, day 1, hour 12 through day 2, hour 11, is less than the value at hour 11 on day 1, so regeneration will not begin. Hour 11 at day 2 is not the highest value for the preceding 24 hours, either, because hour 10 of day 2 was higher. The value of the second derivate at hour 12 of day 2, however, is greater than any value from the preceding 24 hours, so the regeneration process is begun at hour 12 of day 2.

In the just-described embodiment, there may be days in which regeneration does not occur. For example, in the event that the datapoints for days 1 and 2 were switched, no regeneration would occur in day 2. In that scenario, the "peak" value at hour 11 would be lower than the value at hour 12 of the preceding day, so it would not trigger regeneration.

As a further modification, more than one of the preceding embodiments may be combined. For example, it may be desirable to have a look-back to determine existence of a peak, but also ensure that the peak is greater than a threshold value. In still other embodiments, a look back period may be used, but regeneration will not occur if regeneration was performed within some predetermined amount of time. For example, it may be determined that even if a "peak" value is determined, regeneration will not be commenced if regeneration was completed within the last 12 hours, for example.

Other modifications also may be made to the methods described above. In another embodiment, regeneration is triggered depending upon values of the both the first and second derivatives of temperature with respect to time. Specifically, the regenerator may be controlled to operate when the second derivative of temperature with respect to time is at its peak for a given time cycle and the sign of the first derivative is positive for the same cycle and one or more successive cycle. Looking again at FIG. 1, the rate of gradient change curve 106 peaks during the first day at hour 11 and at hour 12 on the second day. Moreover, the temperature gradient, i.e., the first derivative of temperature, is positive for hours 11 and 12 for the first day and for hours 12 and 13 in the second day. Thus, triggering regeneration after the hour 12 reading on the first day and after the hour 13 reading on the second day will result in successful desiccant regeneration. Although this embodiment uses two successive cycles of positive temperature gradient to determine that regeneration should be triggered, more cycles may be used, and may be useful to further ensure that regeneration will be accomplished satisfactorily.

Looking at FIG. 1, any of the values at hours 10, 11, and 12 are elevated, and may be a peak. But, beginning regeneration at hour 10 would be undesirable, because temperature is still decreasing at that time. Alas, the temperature gradient is negative at hour 10 and positive at hour 11 so those times would not fit the requirements of this second embodiment, and thus regeneration would not be started.

In the previously described embodiments interesting peak values for the second derivative are those for a given time interval. Thus, for example, a "peak" is relative to some amount of time, and may be determined in real time by looking back some predetermined amount of time. Although the look-back period may be of any length, in one embodiment, a 24-hour look-back period is used. Thus, for example, it may be determined that the second derivative is at a "peak" value if there has been no greater value in the previous 24 hours. A shorter interval may alternatively be used. Similarly, in the embodiment described above that takes into account both the first and second derivatives, regeneration may only be commenced if 1) there is a peak for the second derivative as measured by looking back some amount of time and 2) there are a predetermined number of successive positive first derivatives after the peak. In this manner, regeneration is reliably accomplished According to the preferred algorithms of this invention, a controller can readily and reliably regenerate a desiccant during a warming cycle. In a preferred embodiment, a controller is programmed to read the temperature information to automatically commence the regeneration process. In other embodiments, a user may monitor the temperature changes and use the foregoing methods to manually begin the regeneration cycle. And in still other embodiments, some of the methods may be performed automatically while others are done manually. For example, a data processor may determine that optimal conditions are present to regenerate the desiccant, with the controller signaling to a user, for example, with an alarm, that regeneration should be started. In response, the user can regenerate the desiccant.

While the invention has been described in connection with several presently preferred embodiments thereof, those skilled in the art will appreciate that many modifications and changes may be made without departing from the true spirit and scope of the invention which accordingly is intended to be defined solely by the appended claims.

The invention claimed is:

1. A method of regenerating a desiccant in a breather communicating with a vessel, comprising:
    measuring, using a temperature sensor, a temperature associated with at least one of the vessel and the breather;
    repeating the measuring step for a plurality of cycles, each cycle having a predetermined duration;
    creating a temperature signal that is the measured temperature for each cycle;
    determining a second derivative of the temperature signal with respect to time; and
    regenerating a desiccant in the breather communicating with the vessel when the second derivative of the temperature signal reaches a peak value.

2. The method of claim 1, wherein the predetermined duration of each cycle is between about 15 minutes and about 90 minutes.

3. The method of claim 2, wherein the predetermined duration of each cycle is about 60 minutes.

4. The method of claim 1, wherein the cycles are repeated for between about 12 hours and about 36 hours.

5. The method of claim 4, wherein the cycles are repeated for about 24 hours.

6. The method of claim 1, wherein the temperature sensor measures a temperature of a headspace in the vessel.

7. The method of claim 1, wherein the temperature sensor measures oil temperature in the vessel.

8. The method of claim 1, wherein the temperature sensor measures air temperature from the breather.

9. The method of claim 1, further comprising determining a first derivative of the temperature signal with respect to time.

10. The method of claim 9, further comprising identifying one or more cycles in which the first derivative of the temperature signal with respect to time is positive.

11. The method of claim 10, wherein the regenerating step is carried out when the second derivative of the temperature signal with respect to time peaks for a given time interval and the sign of the first derivative is positive when the second derivative of the temperature signal with respect to time peaks and in at least one immediately subsequent cycle.

12. The method of claim 11, wherein the given time interval is 24 hours.

13. The method of claim 1, further comprising determining that the second derivative has reached a peak value by confirming that a current value of the second derivative of the temperature signal with respect to time is greater than each value calculated for a predetermined amount of preceding time.

14. A method of regenerating a desiccant in a breather communicating with a vessel, comprising:
    measuring, using a temperature sensor, a temperature associated with at least one of the vessel and the breather;
    repeating the measuring step for a plurality of cycles, each cycle having a predetermined duration;
    creating a temperature signal that is the measured temperature for each cycle;
    determining first and second derivatives of the temperature signal with respect to time; and
    regenerating a desiccant in the breather communicating with the vessel when the first derivative of the temperature signal with respect to time is positive for a plurality of successive cycles and the second derivative of temperature with respect to time is at its peak for the first of the plurality of successive cycles.

15. The method of claim 14, wherein the predetermined duration of each cycle is between about 15 minutes and about 90 minutes.

16. The method of claim 15, wherein the predetermined duration of each cycle is about 60 minutes.

17. The method of claim 14, wherein the cycles are repeated for between about 12 hours and about 36 hours.

18. The method of claim 17, wherein the cycles are repeated for about 24 hours.

19. The method of claim 14, wherein the temperature sensor measures a temperature of a headspace in the vessel.

20. The method of claim 14, wherein the temperature sensor measures oil temperature in the vessel.

21. The method of claim 14, wherein the temperature sensor measures air temperature entering or exiting the breather.

* * * * *